Nov. 20, 1951     A. R. CHAUNCEY     2,575,794

BALED HAY FORK

Filed April 27, 1949

Inventor

Arthur R. Chauncey

By *Clarence A. O'Brien and Harvey B. Jackson*
Attorneys

Patented Nov. 20, 1951

2,575,794

UNITED STATES PATENT OFFICE 2,575,794

BALED HAYFORK

Arthur R. Chauncey, Owego, N. Y.

Application April 27, 1949, Serial No. 89,998

1 Claim. (Cl. 294—49)

This invention relates to a fork of novel construction intended primarily for use on light bales of hay, straw or any other material, which are baled by a pick-up baler, and bound either with wire or string.

The primary object of this invention is to provide a fork of such construction which permits its ready insertion in the bale and permits the bale to be placed and handled with a minimum of ease.

Another object of this invention is to provide a fork in which the handles and stock are positioned very close to the tines so that the lifting force applied to the fork will be correspondingly close to the bale affording maximum efficiency in the lifting and the handling of the bale.

A further object of this invention is to provide a fork of the character described which will do away with the necessity of grasping the baling wires or strings by hand to lift and move the bales.

A further object of this invention is to provide a fork of the character described which makes it possible for one man to handle two bales at the same time, if so desired.

Another object of this invention is to provide a fork which is relatively simple in design and construction, easy to operate, and inexpensive to manufacture.

These, together with various ancillary objects and features of the invention which will later become apparent as the following description proceeds, are attained by the device, a preferred embodiment of which has been illustrated by way of example only in the accompanying drawings, wherein.

Specific reference is now made to the drawings. In the several views in the accompanying drawings and in the following specification reference characters indicate corresponding elements throughout.

Figure 1:
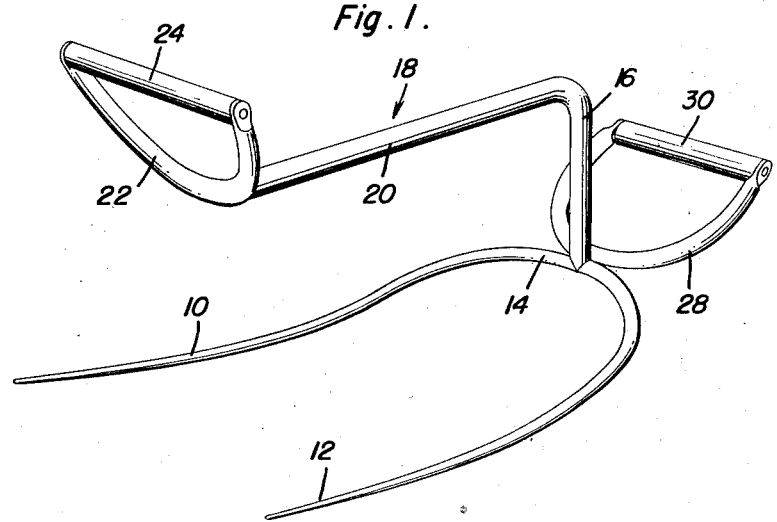
Figure 1 is a perspective view of the fork.
Figure 2:
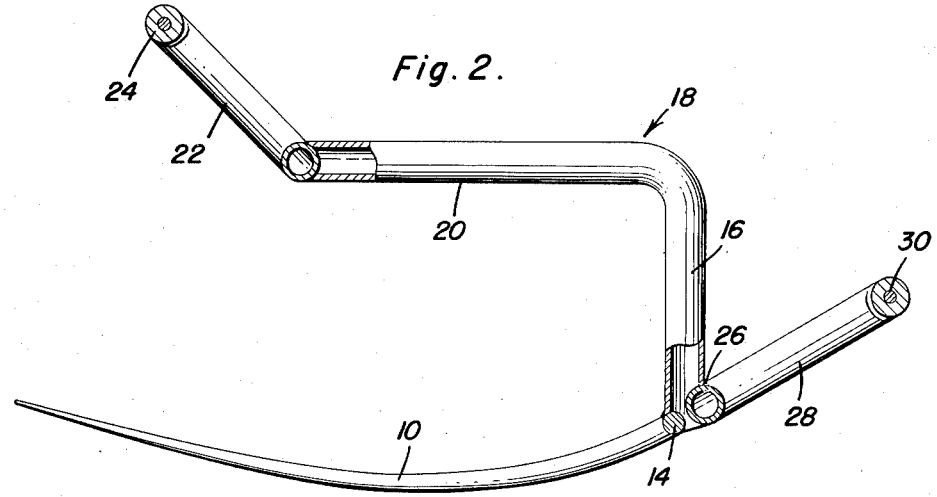
Figure 2 is a longitudinal sectional view through the device with parts of the L-shaped stock shown in elevation.

Indicated generally at 10 and 12 are elongated tines, preferably upturned at their free ends, and interconnected at their rear ends by means of an arcuate web 14. Secured, as by welding, to a central portion of the web 14 is the shorter leg 16 of an L-shaped stock 18, the stock being fabricated preferably of tubular steel. The longer leg 20 of the stock extends longitudinally of and overlies the greater length of the tines 10 and 12 and at its free end carries, as by welding, a conventional U-shaped handle 22, the handle being provided with the conventional roller grip 24 connecting its free ends. The handle 22 is secured to the longer leg 20 at an angle of approximately 45° to the longitudinal axis of the longer leg.

Welded to the rear of the shorter leg 16 and adjacent the web 14 as at 26 is another conventional U-shaped handle 28, the handle being provided with the conventional roller grip 30 connecting the free ends of the handle. The handle 28 is secured to the shorter leg 16 at an angle of 30° to the longitudinal axis of the tines.

In practical operation, the tines are inserted in the baled hay, straw or other material, and the bale is lifted and transported by the handles 22 and 28. While the lifting and transporting operation is greatly improved by the provision of both handles 22 and 28, it will be readily understood that the latter may be omitted, in which case one man will be enabled to handle two bales at the same time.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A fork for baled hay comprising elongated tines interconnected by a web, an L-shaped stock having its shorter leg secured to the web and its longer leg overlying the greater length of said tines, said longer leg being located between the tines and extending in the direction of the pointed ends of said tines, a handle on the free end of said longer leg and inclined upwardly therefrom, and a second handle secured to the shorter leg adjacent the web and inclined upwardly of the web.

ARTHUR R. CHAUNCEY.

REFERENCES CITED

The following references are of record in the file of this patent:

UNITED STATES PATENTS

| Number | Name | Date |
|---|---|---|
| 517,461 | Laffer | April 3, 1894 |
| 1,205,852 | Buehler | Nov. 21, 1916 |
| 1,245,216 | Gohlke | Nov. 6, 1917 |
| 2,244,585 | Tweit | June 3, 1941 |
| 2,318,277 | Yensen | May 4, 1943 |

FOREIGN PATENTS

| Number | Country | Date |
|---|---|---|
| 31,276 | Norway | Oct. 18, 1920 |